United States Patent
Hedley et al.

(10) Patent No.: US 9,612,880 B1
(45) Date of Patent: Apr. 4, 2017

(54) MEDIA DEVICE TEMPERATURE MANAGEMENT

(71) Applicant: Amazon Technologies, Inc., Seattle, WA (US)

(72) Inventors: Jonathan Andrew Hedley, Seattle, WA (US); Cory Beer-Cunningham, Seattle, WA (US); Yi He, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/954,824

(22) Filed: Nov. 30, 2015

(51) Int. Cl.
G06F 9/46 (2006.01)
G06F 9/50 (2006.01)
G06F 9/48 (2006.01)

(52) U.S. Cl.
CPC .............. *G06F 9/5094* (2013.01); *G06F 9/48* (2013.01)

(58) Field of Classification Search
None
See application file for complete search history.

(56) References Cited

U.S. PATENT DOCUMENTS

| | | | |
|---|---|---|---|
| 2013/0328890 A1* | 12/2013 | Avkarogullari | G06F 1/3234 345/501 |
| 2014/0169751 A1* | 6/2014 | Weast | H04N 5/76 386/200 |
| 2014/0324245 A1* | 10/2014 | Kwon | G06F 1/203 700/299 |
| 2016/0048181 A1* | 2/2016 | Rosenzweig | G06F 1/206 713/322 |
| 2016/0085273 A1* | 3/2016 | Delano | G06F 1/182 361/679.11 |
| 2016/0091950 A1* | 3/2016 | Thompson | G06F 1/3206 713/320 |

* cited by examiner

*Primary Examiner* — Dong Kim
(74) *Attorney, Agent, or Firm* — Thorpe North & Western, LLP (57) ABSTRACT

A technology is described for managing a temperature of a media device. An example method may include obtaining a current temperature of a media device configured to execute a media application and historical temperature data for the media device for a defined time period. A processing workload strategy may be calculated for the media application that causes a temperature of the media device to stay within a target temperature range for the media device using in part the target temperature range for the media device and the current temperature of the media device to determine a target temperature error, and the historical temperature data for the media device to determine a rate in change of the processing workload strategy based in part on the target temperature error that contains the temperature of the media device within the target temperature range. The media application may then be instructed to manage execution of media using the processing workload strategy.

20 Claims, 9 Drawing Sheets

MEDIA DEVICE TEMPERATURE MANAGEMENT

BACKGROUND

Media devices, which may include relatively low power digital media players, may be configured to connect to a computer network and stream digital media (e.g., video, music, or images) from a media server, network-attached storage, network connected computer, or Internet streaming service for playback and output to a display (e.g., television, monitor, integrated display, or the like). For example, a low power media device may be an Internet connected set-top box that is connected to a television and may be configured to stream video from a streaming service. In rendering media, power may be consumed by one or more Central Processor Units (CPUs), Graphics Processor Units (GPUs), a wireless radio, storage and/or memory components included in the media device that may generate heat within the media device.

DETAILED DESCRIPTION

A technology is described for managing a temperature of a media device by controlling (e.g., monitoring and modifying) a processing workload for the media device. A media device may include devices such as network connected set-top boxes, streaming media sticks (e.g., a media device that connects directly to a display, such as an HDMI (High-Definition Multimedia Interface) connector), media streaming dongles, portable media players, and other types of media devices. A media device may stream and render media content (e.g., videos, music, or images) over a network or render media content from a memory component included in the media device. Rendering and animating of the media content may result in generating heat that contributes to a temperature of the media device.

A temperature of a media device may be managed, in one example, by controlling a processing workload of various components included in a media device. For example, processing workloads of components, including CPUs, GPUs, wireless radios, memory, and storage components, may be controlled so that heat generated by the components that contribute to a temperature of a media device may be contained with a target temperature range for the media device (e.g., an operating temperature range for a media device that contributes to a stable operating environment). As a specific example, a clock cycle frequency of a media device processor may be periodically set (i.e., increased or decreased) based in part on a current temperature of the media device and a target temperature range for the media device so that heat generated by the processor that contributes to the temperature of the media device may be contained within the target temperature range.

In another example, a temperature of a media device may be managed by calculating a variable time length rest interval in which animation of media content may be suspended, allowing the temperature of the media device to be contained within a target temperature range for the media device. As an example, a screen saver application executing on the media device may suspend animation of a screen saver image from a user's currently stored photo for a rest interval that may be increased or decreased according to the temperature of the media device. The rest interval may be calculated by obtaining a current temperature of the media device and determining an amount of time to suspend animation of the screen saver image to allow the temperature of the media device to stay within a target temperature range for the media device. For example, a screen saver image may be displayed for a default cycle time (e.g., 10 seconds) during a portion of which animation of the screen saver image (e.g., scrolling, panning, or zooming) may be stopped for a time equal to the rest interval (e.g., 3 seconds), where the screen saver image may be statically displayed to allow the temperature of the media device to stay within the target temperature range.

One challenge of making low profile (e.g., a thin or small profile), streamlined media devices may be the effective transfer of heat away from hardware components (e.g., CPUs, GPUs, circuit boards, etc.). In the past, when rendering and animating media to a display, a media device may consume a high amount of power across multiple hardware components included in the media device, creating heat. At high capacity, a thermal dissipation for the media device may not be adequate and the media device may overheat and shorten the life of the media device or create other heat problems. As a result of the current technology, a processing workload strategy for a media device may be managed so that less power may be consumed by the media device and consequently, less heat may be generated. More specifically, a processing workload or a rest interval may be periodically calculated based in part on a current temperature of a media device and a target temperature range for the media device, and the processing workload or rest interval may be implemented so that the temperature of the media device may be contained within the target temperature range.

Figure 1:
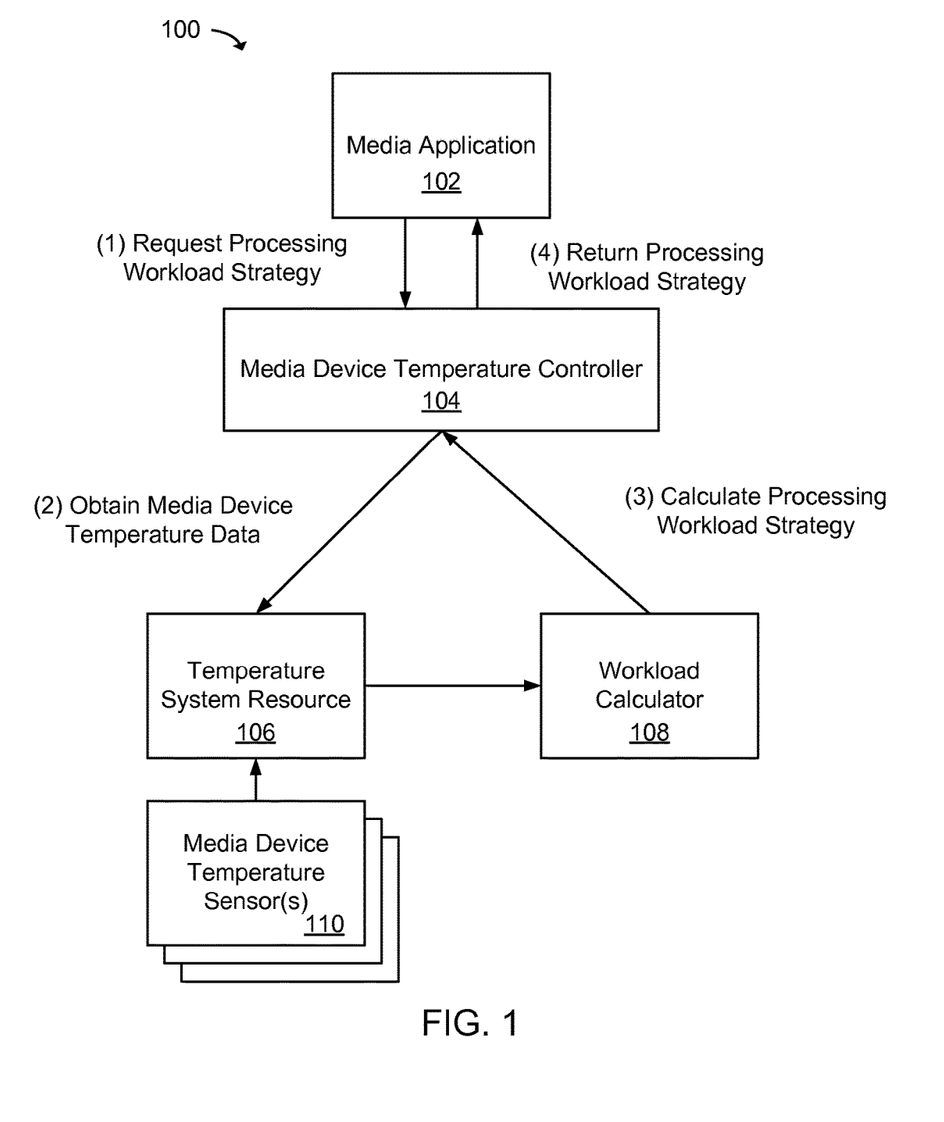
FIG. 1 is a block diagram illustrating an example system for managing a temperature of a media device by monitoring and modifying a processing workload implemented by a media application executing on the media device.

FIG. 1 is a diagram illustrating a high level example of a system 100 that may be used to manage a temperature of a media device via a processing workload strategy provided to a media application 102. The system 100 may include a media device temperature controller 104 configured to provide a media application 102 with a processing workload strategy for rendering media content or a rest interval in which animation of media content may be suspended. The media application 102 may be configured to render and animate images, video, games, screen savers, or audio and may periodically obtain or be provided with a processing workload strategy or a rest interval from the media device temperature controller 104.

In one example, a processing workload strategy provided to a media application 102 may be instructions or specifications for rendering and animating media (e.g., images, video, music, and the like), such that when the processing workload strategy is implemented, a temperature of the media device may be contained within a target temperature range for the media device. A target temperature may be specified for one or more device components (e.g., CPU, memory, hard drive) or a device surface temperature. Also, various target temperature profiles may be used, such as a target temperature profiles for gaming, video playback, or screen saver.

The processing workload strategy may be periodically adjusted to align the device media temperature with the target temperature range. Illustratively, a processing workload strategy may refer to aspects of rendering and animating electronic media that may have an effect on the workload of a CPU, GPU, computer memory, network radio, or other processing components in the media device. For example, a processing workload strategy may refer to a frame rate for rendering videos and images, media buffering, or a rest interval during which rendering of an image or video may be suspended. As described in relation to FIG. 2, a processing workload strategy may refer to the workload of a media device component. More broadly, a processing workload strategy may refer to any aspect of processing associated with hardware components included in a media device and/or software executed on the media device that can be managed via the processing workload strategy that results in managing heat produced by the hardware components.

As an example, a media application 102 used to render video may be provided a frame rate for rendering the video. The frame rate provided to the media application 102, when implemented by the media application 102, may cause hardware components utilized to render the video to produce an amount of heat that is within a target temperature range for the media device. As a specific example, a frame rate of 48 fps (frames per second) used by the media application 102 to render video may result in a device temperature increasing above a target temperature range. As such, a lower frame rate (e.g., 24 fps) may be provided to the media application 102 in an expectation that the lower frame rate may result in lowering the temperature of the media device to be within the target temperature range.

As another example, a media application 102 configured to render images, such as animating images or animating screen saver images (e.g., panning, rotating, zooming, scaling etc.), scrolling information across images (e.g., news, weather, stocks, advertisements, etc.), generating graphic images, or the like may be provided a rest interval that specifies an interval of time during which animation of the images may be stopped and a static image may be displayed allowing a temperature of the media device to be contained within a target temperature range for the media device. More specifically, the rest interval may result in a smaller processing workload for the hardware components which may cause the hardware components to produce less heat that contributes to the temperature of the media device. As such, the temperature of the media device may be contained within a target temperature range for the media device by implementing the rest interval.

Figure 5:
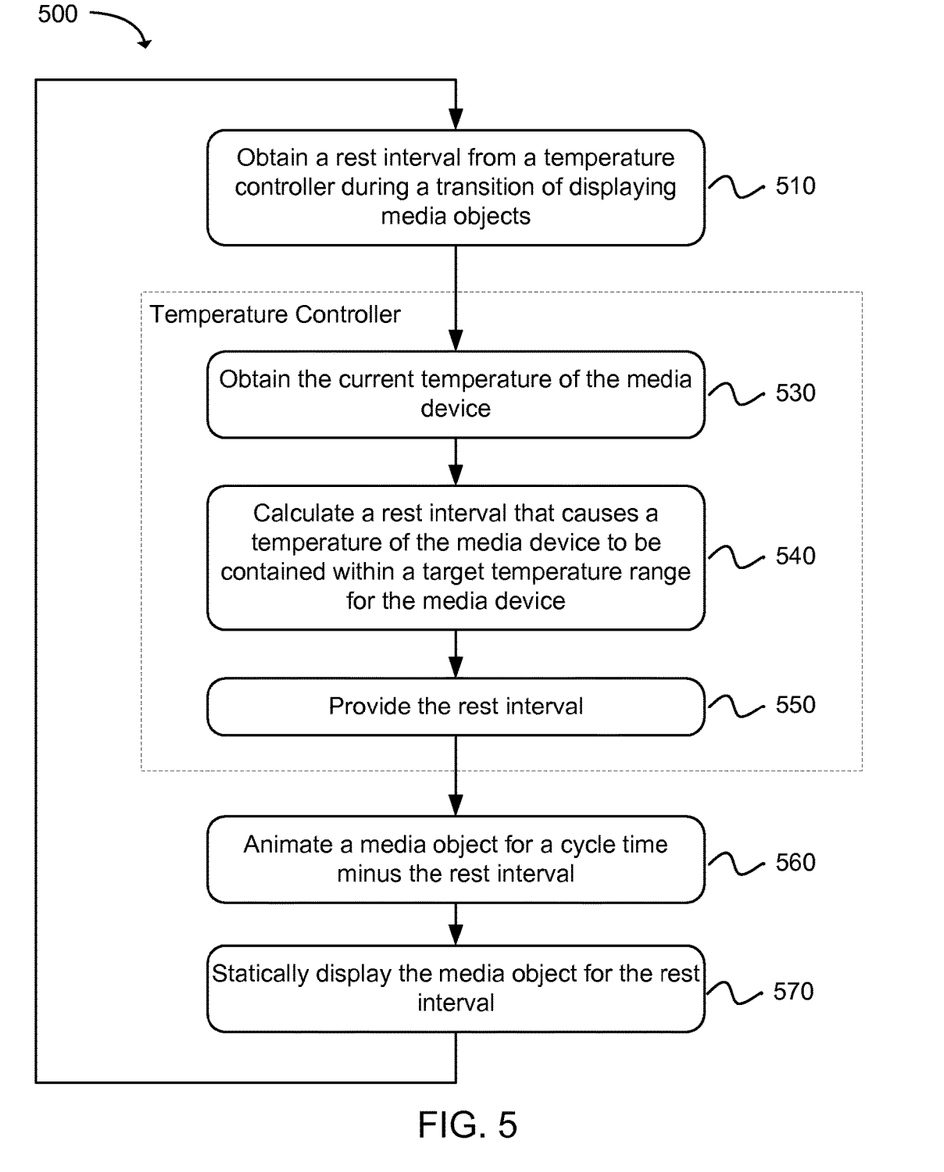
FIG. 5 is a flow diagram that illustrates an example method for calculating a rest interval used to manage the temperature of a media device.
Figure 6:
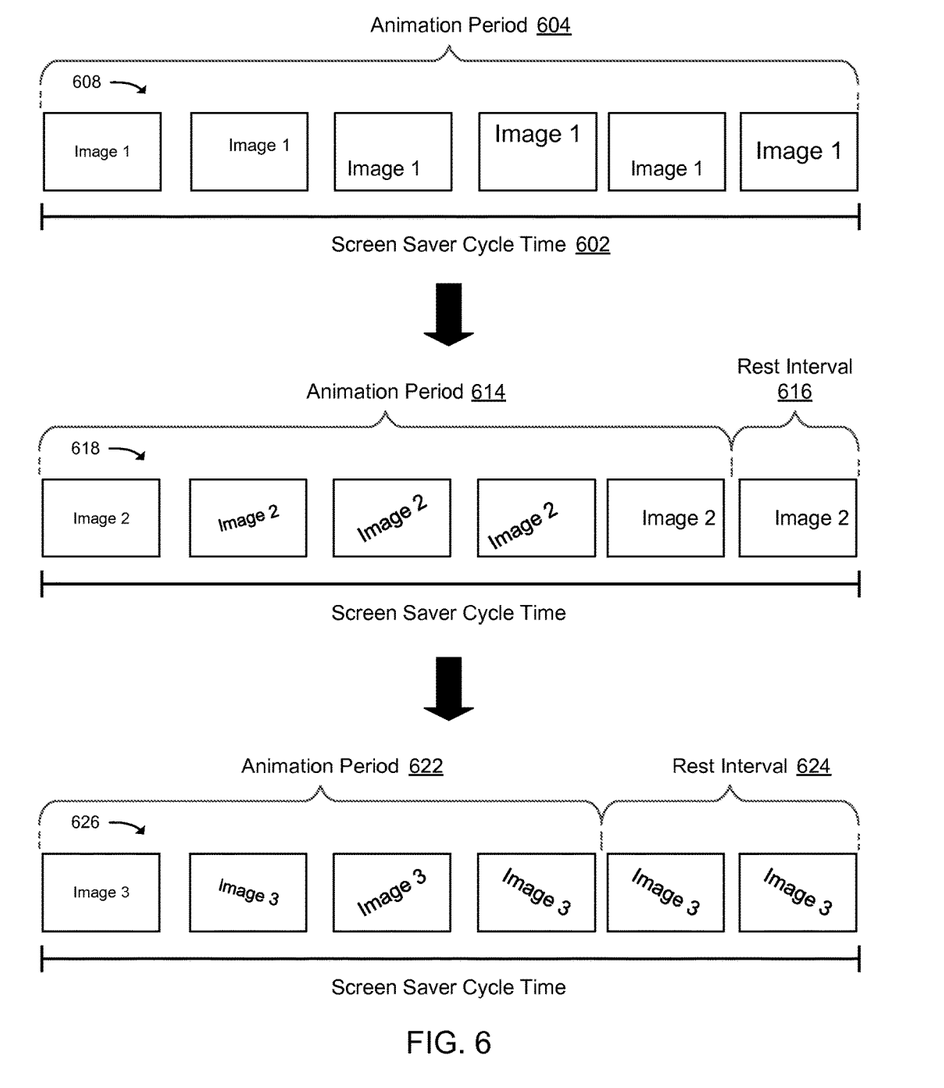
FIG. 6 is a diagram illustrating an example transition for rendering images to a display as part of a screen saver during which a rest interval may be modified.

In one example, a rest interval may be a portion of a cycle time for displaying an image versus processing an image as described in relation to FIGS. 5 and 6. In another example, the rest interval may be implemented periodically while rendering and animating one or more images, such that animation of an image may be stopped for the rest interval and animation of the image may be resumed at the end of the rest interval. As a specific example, a rest interval of two seconds may be implemented after every eight seconds of animation of an image so that during the rest interval the image may be statically displayed and during rendering the image may be programmatically manipulated.

The media device temperature controller 104, in one example, may be configured to provide a process workload to a media application 102 by obtaining temperature data for the media device from a temperature system resource 106 (e.g., computer memory or system file) and calculating a process workload using a workload calculator 108. For example, the temperature system resource 106 may include a current temperature of the media device provided by one or more media device temperature sensors 110 (e.g., a temperature sensor located on a circuit board, hard drive, device housing, CPU, GPU, etc.) or a modeled surface temperature of the media device, historical temperature data for the media device, and a target temperature range for the media device. The media device temperature data may then be used to calculate a processing workload strategy that may be provided to the media application 102, which may be implemented by the media application 102, thereby managing the temperature of the media device. The temperature of the media device may be periodically sampled and evaluated to determine how well the current temperature of the media device may be aligned with the target temperature range and a new processing workload strategy may be calculated based in part on the determination.

Calculating a processing workload strategy, in one example, may involve using the current temperature of a media device to determine a target temperature error (e.g., a difference between the current temperature and the target temperature range), and using historical temperature data for the media device to determine a change in the processing workload strategy that results in aligning the temperature of the media device with the target temperature range based in part on the target temperature error. For example, the historical temperature data may be analyzed to determine what effect the processing workload strategy has had in aligning the temperature of the media device with the target temperature range and calculate a processing workload strategy based on the analysis. As an illustration, a target temperature range for a media device may be 67°-73° Celsius and a current temperature of the media device may be 77° Celsius. The last four historical temperature readings (e.g., 81°, 79°, 77°, and 77° Celsius) for the media device may show that the temperature of the media device over time may not be effectively aligning with the target temperature range. Therefore, the processing workload strategy may be decreased in order to bring the temperature of the media device in alignment with the target temperature range for the media device.

Also, in calculating the processing workload strategy, a rate of change of the processing workload strategy over time may be identified that maintains presentation quality for a user while bringing the temperature of the media device in alignment with the target temperature range. Illustratively, significant changes made to a processing workload strategy in a short amount of time may result in a poor presentation quality for a user. For example, abruptly changing an animation rest interval used as part of displaying an image may give the appearance that the media device may not be functioning properly or that a network connection may have been lost. For instance, changing an animation rest interval from one second to five seconds may cause a user to believe that the media device may not be responding (e.g., crashed) and may need to be restarted. Therefore, a rate of change for a processing workload strategy may be calculated so that the rate of change smooths out changes made to the processing workload strategy over time, thereby maintaining presentation quality while aligning the temperature of the media device with a target temperature range. For example, a rendering rest interval may be incrementally increased over time (e.g., from one second, to two seconds, to three seconds) until the rest interval is set to a value that causes a media device temperature to be contained within a target temperature range.

Figure 4:
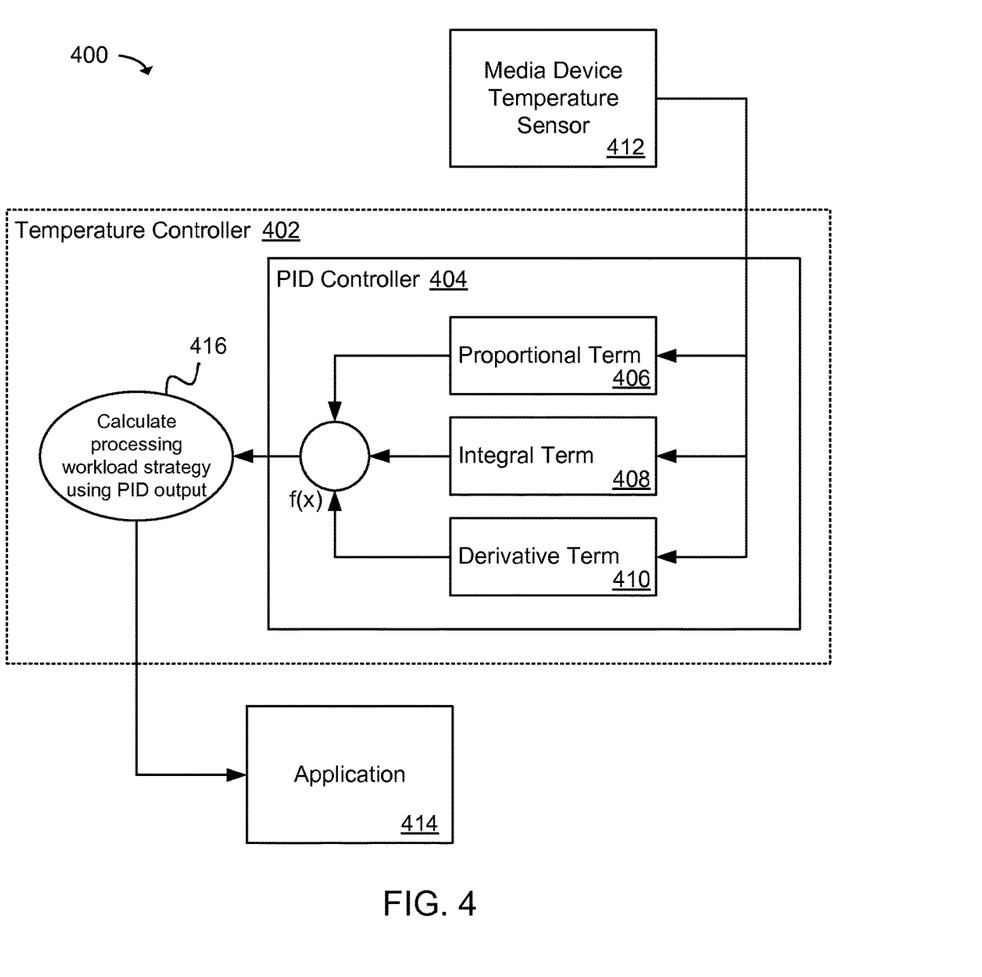
FIG. 4 is a block diagram that illustrates an example system for calculating a processing workload strategy using a PID controller.

In one example configuration, a Proportional Integral Derivative (PID) controller may be used to calculate a processing workflow as described in relation to FIG. 4. For example, the PID controller may include a proportional term that provides a target temperature error at a time that the current temperature of the media device is obtained, an integral term that provides a historical temperature error using the current temperature of the media device and the historical temperature data for the media device, and a derivative term that provides a change in temperature error using the target temperature range for the media device and the current temperature of the media device and the historical temperature data for the media device. Using the proportional term, the integral term, and the derivative term, a processing workload strategy may be calculated and the processing workload strategy may be provided to the media application 102, which then implements the processing workload strategy. The process may be repeated periodically (e.g., every few second or minutes) using the PID controller to update the processing workload strategy as conditions in the media device change. As a specific example, the PID controller may be used to calculate a render rest interval and the rest interval may be provided to a media application 102 configured to render and animate images, and the media application 102 may implement the rest interval by stopping animation of an image for a period of time equal to the rest interval.

Figure 2:
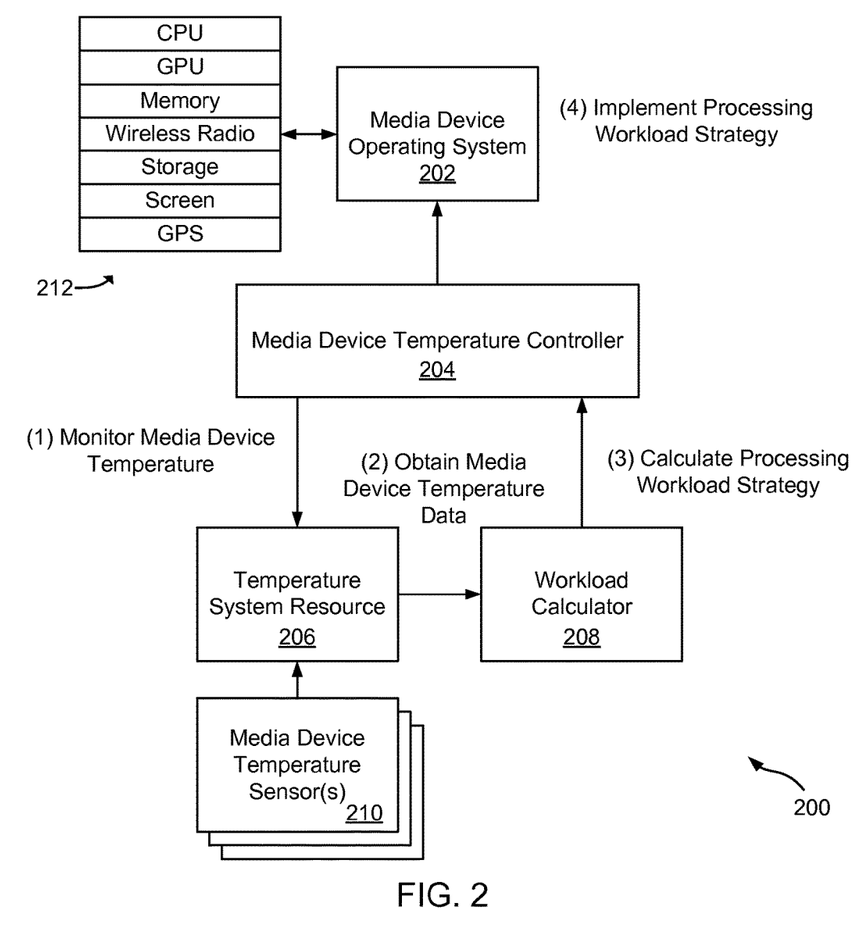
FIG. 2 is a block diagram that illustrates an example system for managing a temperature of a media device by monitoring and modifying a processing workload implemented by a media device operating system.

FIG. 2 is a diagram illustrating another high level example of a system 200 that may be used to manage a temperature of a media device via a processing workload strategy implemented using a media device operating system 202. As illustrated, the system 200 may include a media device temperature controller 204 configured to provide the media device operating system 202 with a processing workload strategy that may be expected to contain a temperature of a media device within a target temperature range for the media device. The media device operating system 202 may implement the processing workload strategy for media device components that may be controlled by the media device operating system 202. For example, aspects of media device components 212 CPUs, GPUs, memory, wireless radios (e.g., WI-FI and BLUETOOTH), storage (e.g., hard drive), screen brightness, GPS (global positioning system), cameras may be controlled using the media device operating system 202. Also, the media device operating system 202 may control background services (account syncing services, third-party application services, idle management services, etc.) whose execution may negatively affect the temperature of the media device.

Illustratively, the media device operating system 202 may control a processor frequency, a wireless radio's power output, or a GPU's workload, which may influence an amount of heat produced by the media device components. As a specific example, changing a processor frequency of a media device processor may affect an amount of heat produced by the media device processor, such that increasing the processor frequency may increase an amount of heat produced by the media device processor and decreasing the processor frequency may decrease the amount of heat produced by the media device processor. Therefore, a processing workload strategy provided to the media device operating system by the media device temperature controller 204 may be a processor frequency that the media device operating system 202 implements in order to contain the temperature of the media device within a target temperature range.

As another specific example, an amount of heat generated by a wireless radio may be controlled by obtaining (downloading) a batch of media files that are to be animated by the media device via a wireless network connection using the wireless radio and storing (caching) the media files in computer memory of the media device after downloading the batch of media files. The power output of the wireless radio may then be reduced, or the wireless radio may be deactivated, thereby reducing an amount of heat generated by the wireless radio that contributes to the temperature of the media device, and some media files may be retrieved from the computer memory instead of using the wireless radio each time the media files are retrieved over the network connection.

As another illustration, one or more background services unaffiliated with executing a media file on the media device may be identified and suspended or terminated as part of managing the temperature of the media device. For example, a background service executing on the media device not associated with executing the media file may cause the temperature of the media device to increase above the target temperature range. For instance, a background service may cause some media device components (e.g., processors) to generate additional heat while media is being rendered that would not otherwise be generated if the background service where not executing. As such, the operating system 202 may suspend or terminate background services that may be contributing to a media device temperature that exceeds a target temperature range.

In one example, the media device temperature controller 204 may be configured to monitor the temperature of the media device and provide a processing workload strategy to the media device operating system 202 that implements the processing workload strategy when the temperature of the media device falls outside of a target temperature boundary. For example, a current temperature of the media device may be monitored and in the case that the current temperature does not align with a target temperature (e.g., the current temperature does not fall within a target temperature boundary), a processing workload strategy may be calculated that may be expected to result in aligning the temperature of the media device with the target temperature boundary.

In another example, the media device temperature controller 204 may be configured to periodically calculate a processing workload strategy that may be expected to cause a temperature of the media device to be contained within a target temperature range for the media device, and provide the processing workload strategy to the media device operating system 202. For example, at a predetermined frequency (e.g., 30, 60, or 300 seconds) the current temperature of a media device may be evaluated to determine how well the current temperature aligns with a target temperature range of the media device and a processing workload strategy may be calculated based in part on the evaluation of the current temperature, and the processing workload strategy may be provided to the media device operating system 202 configured to implement the processing workload strategy. As described earlier, calculating a processing workload strategy may include obtaining media device temperature data from a temperature system resource 206 that includes a current temperature provided by a media device temperature sensor 210 or a modeled surface temperature of the media device, and a process workload may be calculated using a workload calculator 208 and the media device temperature data. In one example, the workload calculator 208 may be configured to calculate a processing workload strategy using a PID controller as described later.

In implementing a processing workload strategy, the media device operating system 202 may modify an aspect of a media device component associated with the processing workload strategy, resulting in managing an amount of heat that may be generated by the media device component. For example, a processing workload strategy may specify a processing frequency for a CPU and/or a GPU and the media device operating system 202 may implement the processing workload strategy by setting the processing frequency of the CPU and/or the GPU to a processing frequency specified by the processing workload strategy, thereby altering an amount of heat generated by the CPU and/or the GPU. For example, increasing the processing frequency may increase an amount of heat generated by a processor and decreasing the processing frequency may decrease an amount of heat generated by the processor. Therefore, a processing workload strategy specifying a processing frequency may be calculated that results in increasing or decreasing the temperature of the media device based on a current temperature and a target temperature range for the media device.

As another example, a processing workload strategy may specify a read/write access to media device memory (e.g., Random Access Memory (RAM)) within a time interval that affects an amount of heat generated by the media device memory. For example, a processing workload strategy may be calculated based on an amount of heat that the media device memory may be expected to generate as a result of read/write access operations performed within the time interval and the processing workload strategy may be provided to the media device operation system 202 that implements the read/write access specified by the processing workload strategy.

As yet another example, a processing workload strategy may specify an output power of a wireless radio used to communicate over a wireless network and the media device operating system 202 may implement the processing workload strategy by setting the output power of the wireless radio to an output power specified by the processing workload strategy, thereby altering an amount of heat generated by the wireless radio. For example, in the case that a current temperature of the media device may be above a target temperature range, the output power of the wireless radio may be decreased according to a processing workload strategy calculated using the workload calculator 208, thereby reducing the amount of heat generated by the wireless radio. In the case that the current temperature of the media device may be below the target temperature range for the media device, the power output of the wireless radio may be increased according to a processing workload strategy, thereby allowing the wireless radio to generate more heat (and broadcast farther) and the temperature of the media device to come within the target temperature range.

In one example, the temperature of a media device may be managed by simultaneously controlling aspects of media device components that contribute heat to the temperature of the media device using the media device operating system 202 to implement processing workload strategies for the media device components. As a specific example, a processing frequency for a CPU and a GPU may be controlled in combination with output power of a wireless radio by calculating individual processing workload strategies for the CPU, GPU, and the wireless radio that account for heat generated by each of the media device components that contributes to an overall temperature of a media device.

Figure 3:
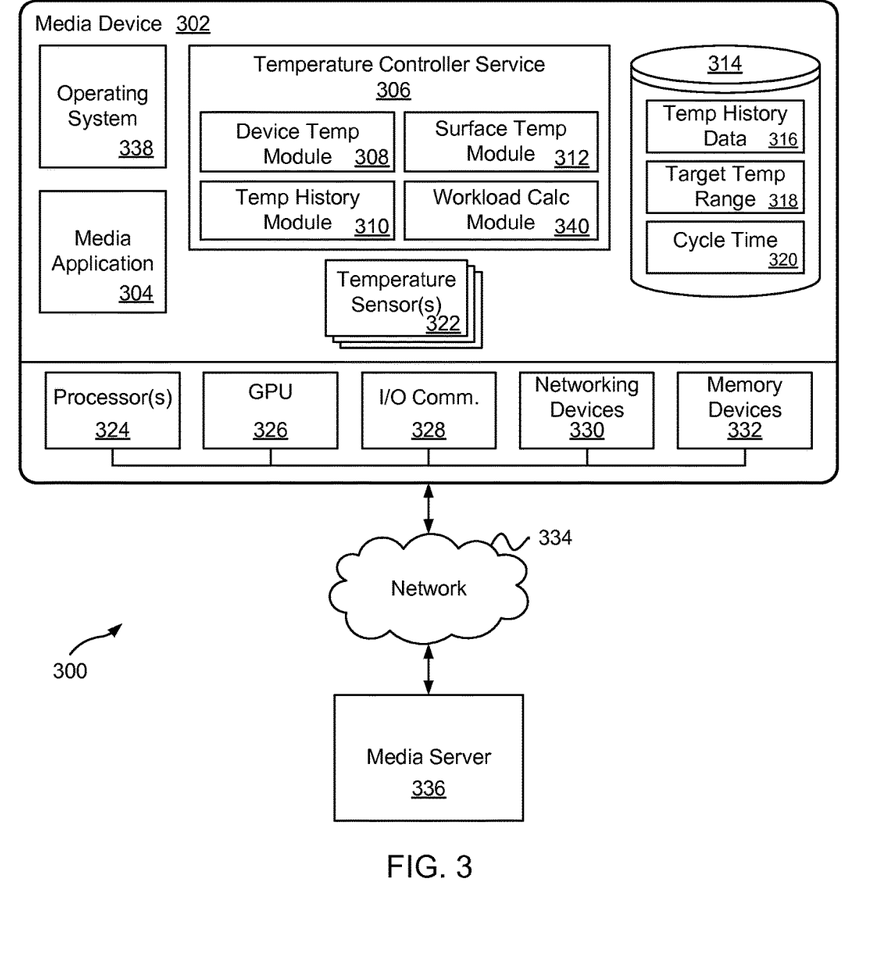
FIG. 3 is a block diagram that illustrates various example components included in a system for managing the temperature of a media device.

FIG. 3 illustrates components of an example system 300 on which the present technology may be executed. The system 300 may include a media device 302 that may be in communication with a media server 336 via a network 334. The media device 302 may comprise a processor-based system such as a computing device that includes one or more processors 324, GPUs 326, Input/Output components 328, networking devices 330, and memory devices 332. Also, the media device 302 may be configured to execute an operating system 338, a media application 304 that renders electronic media (e.g., images, video, and/or artwork), and a temperature controller service 306 that may include a number of modules used to provide the media application 304 or the operating system 338 with a processing workload strategy.

As illustrated, the temperature controller service 306 may include a device temperature module 308, a surface temperature module 312, a temperature history module 310, and a workload calculation module 340. The device temperature module 308 may be configured to obtain a media device temperature from a temperature sensor 322 included in the media device 302. Illustratively, the temperature sensor 322 may be located on a circuit board of low profile media devices like streaming media sticks, streaming media dongles, and set-top box media devices. As such, a temperature reading generated by the temperature sensor 322 may provide a "core" temperature or internal temperature of the media device 302 at a defined location near hardware chips or on a printed circuit board that may be compared to a target temperature or a target temperature range 318 for the media device 302.

Some media devices 302 (e.g., media devices designed to allow an airflow to circulate within the chassis of the media device 302) may include a surface temperature module 312 configured to model a surface temperature for the media device 302 that may be compared to a target temperature or target temperature range 318 for the media device 302. In one example, a temperature reading may be obtained from a temperature sensor 322 located in the media device 302 (e.g., on a circuit board), or from a number of media device components, and a surface temperature may be calculated by inputting the temperature reading into a surface temperature model constructed for the media device 302.

A current temperature (i.e., a temperature sensor reading or a surface temperature calculation) may be provided to the workload calculation module 340 that may be configured to calculate a processing workload strategy using the current temperature, a target temperature range 318, and temperature history data 316 for the media device 302. In one example, the workload calculation module 340 may be configured to function as a PID controller as described in relation to FIG. 4.

In another example, the workload calculation module 340 may be configured to calculate a rest interval (e.g., a period of time in which animation of media may be suspended) by comparing a current temperature of the media device 302 to a target temperature or target temperature range 318 for the media device 302 in order to determine a temperature difference or temperature error between the current temperature and the target temperature or target temperature range 318. Temperature history data 316 for the media device 302 may be retrieved (e.g., the last 5, 10, or 20 temperature readings) and analyzed to determine an effectiveness of past rest intervals to moderate the temperature of the media device 302 over a defined time period. The defined time period, for example, may be a number of recent cycles of media rendering (e.g., as part of a slideshow or screen saver) during which a current temperature reading may have been obtained at the beginning or the end of a cycle time 320. The temperature readings may be analyzed to determine whether the temperature readings have been trending towards the target temperature or have been contained within the target temperature range 318 and a rate of change may be determined for the rest interval over a time period, (e.g., over the next number of rendering cycles) based in part on the analysis.

Further, a rest interval may be calculated based in part on the temperature difference between the current temperature and the target temperature or target temperature range 318 and the rate of change. The rest interval may then be provided to the media application 304, which may be configured to stop animation of the media for a time period equal to the rest interval during a portion of the cycle time 320 allowing the media device temperature to conform to the target temperature or stay within the target temperature range 318.

The various processes and/or other functionality contained within the media device 302 may be executed on one or more processors 324 that are in communication with one or more memory devices 332. A data store 314 may be used to store temperature history data 316, a target temperature range 318, a cycle time 320, and other data. The term "data store" may refer to any device or combination of devices capable of storing, accessing, organizing and/or retrieving data. In some examples, the data store 314 may be located on a remote server that may be accessible over the network 334 and may include any combination and number of data servers, relational databases, object oriented databases, cluster storage systems, data storage devices, data warehouses, flat files and data storage configuration in any centralized, distributed, or clustered environment. The storage system components of the data store 314 may include storage systems such as a SAN (Storage Area Network), cloud storage network, volatile or non-volatile RAM, optical media, or hard-drive type media. The data store 314 may be representative of a plurality of data stores as can be appreciated.

The network 334 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on the media device 302. A service may be a service application that may receive requests and provide output to other services. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Moving now to FIG. 4, a block diagram illustrates an example system 400 for calculating a processing workload strategy using a PID controller 404. As illustrated, a temperature controller 402 for a media device may be configured to calculate 416 a processing workload strategy using the PID controller 404 and provide the processing workload strategy to an application 414. In general, a PID controller 404 may be configured to calculate an "error value" as the difference between a measured process variable (e.g., a media device temperature) and a desired set point (e.g., a target temperature or target temperature range). The PID controller 404 may be configured to minimize the error over time by adjusting a control variable (e.g., a processing workload strategy of an application or media device component such as, a processor, GPU, wireless radio, etc.), to a new value determined by a function.

The function may be evaluated using proportional, integral, and derivative term coefficients, where the proportional term 406 accounts for present values of the error (e.g. if the error is large and positive, the control output will also be large and positive), the integral term 408 accounts for past values of the error (e.g. if the output is not sufficient to reduce the size of the error, the error will accumulate over time, causing the PID controller to apply stronger output), and the derivative term 410 that accounts for predicted future values of the error, based on the error's current rate of change.

For example, the proportional term 406 may provide a target temperature error at a time that the current temperature of the media device is obtained from a media device temperature sensor 412, the integral term 408 may provide a historical temperature error using the current temperature of the media device and the historical temperature data for the media device, and the derivative term 410 may provide a change in temperature error based on a rate of change over a period of time using the target temperature or target temperature range for the media device and the current temperature of the media device and the historical temperature data for the media device.

A processing workload strategy may be calculated and the processing workload strategy may be provided by the temperature controller 402 to the application 414. In some examples, a cycle time value specifying an amount of time that media may be rendered to a display may be input to the PID controller and the cycle time value may be used to determine a rest interval that may be a percentage of the cycle time value. As one specific example, where a cycle time may comprise ten seconds that a media object may be rendered and animated (e.g., scroll, pan, zoom, etc.) to a display, a rest interval may be one, two, or three seconds of the cycle time in which the media object may not be animated, thereby allowing media device components used to animate the media object to cool down so that the temperature of the media device may be allowed to align with a target temperature for the media device or stay contained within a target temperature range for the media device.

FIG. 5 is a flow diagram illustrating an example method 500 for managing a temperature of a media device by calculating a rest interval during which animation of a media object may be suspended in order to keep the temperature of the media device contained within a target temperature range for the media device. More specifically, a rest interval may be a period of time (e.g., 2, 4, or 10 seconds) that animation of a media object (e.g., scrolling, panning, zooming of news, weather, stock prices, advertisements, photos, etc.) is stopped so that utilization of media device components (e.g., a GPU) that generate heat as part of rendering and animating the media object may be scaled back allowing the temperature of the media device to decrease. As a specific example, a media application configured to scroll news headlines across a display may be instructed to stop scrolling of the news headlines for a period of time that may be equal to a rest interval during which a static image of the news headlines may be displayed, but scrolling of the news headlines may be suspended.

Starting in block 510, during a transition of displaying media objects to a display, a rest interval may be obtained from a temperature controller included in a media device. For example, during the transition in which rendering of a first media object may be discontinued and rendering of a second media object may be started, a request for the rest interval may be made to the temperature controller, which may be configured to calculate the rest interval based in part on the temperature of the media device.

In some examples, a media application may be configured to identify an animation style (e.g., pan mode, zoom mode, scroll mode, etc.) used to animate a media object and determine whether the animation style has been identified as causing a temperature of a media device to exceed a target temperature range. For example, some animation styles may cause a GPU to work harder as compared to other animation styles, causing the GPU to consume more power and generate more heat as compared to what may be generated using the other animation styles. In the case that the animation style may not be associated with causing a temperature of a media device to exceed a target temperature range, a rest interval may not be calculated. However, in the case that an animation style may be identified as being associated with media device temperatures that are above a target temperature range, a rest interval may be calculated.

As in block 530, the temperature controller may be configured to obtain the current temperature of the media device from a temperature sensor included in the media device, or from a surface temperature model used to calculate a surface temperature of the media device. Also, historical temperature data for the media device may be obtained for a defined time period (e.g., the past 5, 10, or 20 display cycles or minutes) and a cycle time setting may be obtained that specifies an amount of time that the media object is displayed to a display (e.g., an amount of time that an image is displayed before switching to another image). The historical temperature data and the cycle time may be used as part of calculating the rest interval. In one example, the current temperature of the media device may be stored to computer memory included in the media device that contains historical temperature data, thereby storing the current temperature as historical temperature data that may be used in future rest interval calculations.

As in block 540, a rest interval may be calculated that causes a temperature of the media device to be contained within a target temperature range for the media device. In one example, a rest interval may be calculated by first determining a difference between a target temperature range for the media device and the current temperature of the media device and determine whether the current temperature exceeds the target temperature range, and then second, determine a change of the rest interval that may be expected to result in the media device temperature to align with the target temperature range based in part on the difference between a bound of the target temperature range and the current temperature.

In another example, historical temperature data for the media device may be analyzed to determine an effectiveness of the rest interval to moderate the temperature of the media device over time and the rest interval may be adjusted according to the analysis. For example, in the case that the analysis of the historical temperature data shows that a current rest interval may not be effective in bringing the media device temperature within a target temperature range, the rest interval may be increased. In yet another example, a rate of change of the rest interval over a period of time that avoids unnecessarily large changes to the rest interval (resulting in poor customer experience) may be calculated. For example, rather than increasing a current rest interval from one second to four seconds, the rest interval may be incrementally increased over a period of four display cycles. Also, in some examples, a PID controller as described earlier may be used to calculate a rest interval.

In yet another example, both a cycle time for displaying media objects to a display and a rest interval may be calculated based in part on the temperature of the media device. Illustratively, a screen saver may cycle through media objects that are displayed to a display using a cycle time to transition from one media object to another media object. The cycle time may be a static value (e.g., 5, 8, or 10 seconds) or, as in this example, may be a variable value that may be calculated based in part on the temperature of the media device. The lengths of the cycle time and the rest interval may have an effect on the temperature of the media device, therefore a cycle time and a rest interval that have the effect of aligning the temperature of the media device with a target temperature range may be calculated. In one example, the cycle time may be included as an input to a PID controller.

After calculating a rest interval that may be expected to align the temperature of the media device with the target temperature range, as in block 550, the rest interval may be provided to an application (e.g., a screen saver application) that may be configured to implement the rest interval. More specifically, as in block 560, a media object may be animated for a cycle time minus the rest interval, and as in block 570, may be statically displayed for an amount of time equal to the rest interval. As a specific example, the cycle time for displaying the media object may be twelve seconds and the rest interval may be three seconds. As such, the media object may be animated for nine seconds of the cycle time and held static for the remaining three seconds of the cycle time. At the end of the cycle time, and prior to transitioning to another media object, the temperature of the media device may be reevaluated to determine whether to modify the rest interval based on the effectiveness of the rest interval to contain the temperature of the media device with the target temperature range.

In another example, a rest interval may be distributed over a cycle time during which a media object may be displayed to a display, such that animation of the media object may be stopped at various points during the cycle time. As a specific example, during a cycle time (e.g., 10 seconds) in which a news headline, stock price, or advertisement may be scrolled across a display, scrolling of the news headline, stock price, or advertisement may be stopped for one second of every two seconds of the cycle time so that the news headline, stock price, or advertisement is statically displayed during the one second rest interval, thereby allowing the temperature of the media device to be contained within a target temperature range. The rest interval may be reevaluated after each cycle time, as described above, to determine whether the rest interval may need to be increased or decreased in order to contain the temperature of the media device within the target temperature range for the media device.

FIG. 6 is a diagram that illustrates a transition between rendering images to a display as part of a screen saver during which a rest interval as described above may be implemented and modified in-between transitions of displaying the images. As illustrated, a screen saver cycle time 602 (e.g., 3, 5, 8, 10, etc. seconds) may comprise animating an image 608 using a panning and zooming effect for an animation period 604. In one example, during a transition where a first image 608 may be replaced with a second image 618, a temperature for a media device may be evaluated and a rest interval 616 may be calculated as described earlier using a PID controller or another method. The rest interval 616 may be implemented, resulting in animating the second image 618 for an animation period 614 and statically displaying the image 618 for the rest interval 616, so that the temperature of a media device may be contained within the target temperature range for the media device.

The temperature of the media device may again be evaluated during a transition from displaying the second image 618 to displaying a third image 626, and another rest interval 624 may be calculated that may be equal to, less than, or greater than the previous rest interval 616. The rest interval 624 may then be implemented and the third image 626 may be animated for an animation period 622 and statically displayed during the rest interval 624 comprising a remainder of the screen saver cycle time 602.

Figure 7:
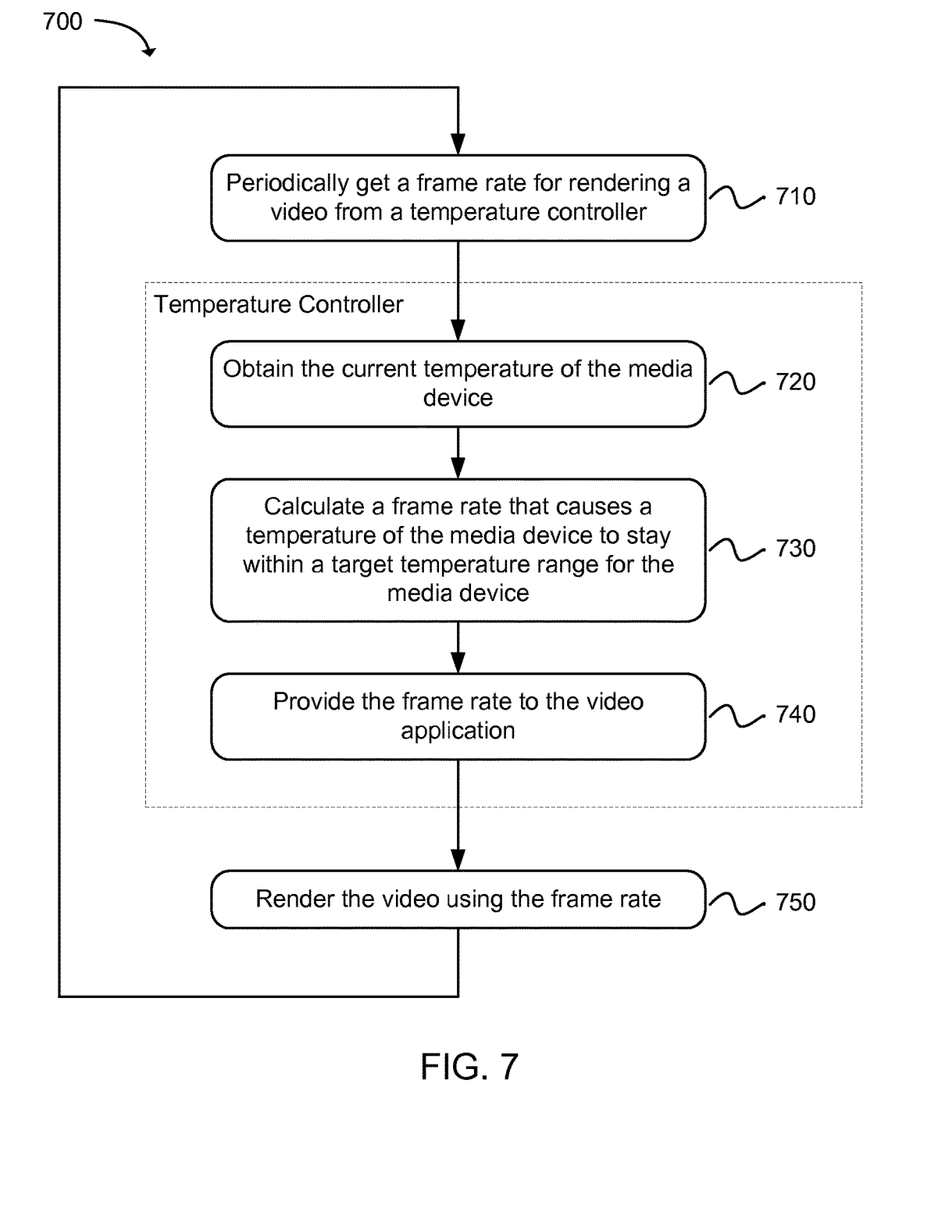
FIG. 7 is a flow diagram that illustrates an example method for managing a temperature of a media device by calculating a frame rate used to render a video.

FIG. 7 is a flow diagram illustrating an example method 700 for managing a temperature of a media device by calculating a frame rate used to render a video. Illustratively, a temperature of a media device may be influenced by a frame rate used to render a video due to a processing workload strategy placed on a GPU. For example, a higher frame rate may cause the GPU to consume more power and generate more heat as compared to a lower frame rate. Thus, by adjusting the frame rate, the temperature of the media device may be managed. Starting in block 710, during rendering of the video, a frame rate used in rendering the video may be periodically obtained from a temperature controller configured to calculate a frame rate that results in containing a temperature of a media device within a target temperature range for the media device.

As in block 720, the temperature controller may obtain a current temperature of the media device from a temperature sensor included in the media device, or from a surface temperature model used to calculate a surface temperature of the media device. Also, historical temperature data for the media device may be obtained for a defined time period (e.g., the past 2, 3, or 5 minutes). As in block 730, a frame rate may be calculated that causes the temperature of the media device to stay within a target temperature range for the media device.

In one example, a frame rate may be calculated by first determining a difference between a target temperature range for the media device and the current temperature of the media device and determining whether the current temperature exceeds the target temperature range, and then second, determine a change of the frame rate that may be expected to result in the media device temperature to align with the target temperature range based in part on the difference between the target temperature range and the current temperature.

In another example, historical temperature data for the media device may be analyzed to determine an effectiveness of a frame rate to moderate the temperature of the media device over time and the frame rate may be adjusted according to the analysis. For example, in the case that analysis of the historical temperature data shows that a current frame rate (e.g., 60 fps) may not be effective in bringing the media device temperature within a target temperature range, the frame rate may be decreased (e.g., to 50 fps). In yet another example, a rate of change over time may be calculated for the frame rate that results in maintaining a good customer experience. For example, over a period of a few minutes, the frame rate may be incrementally decreased from 60 fps to 24 fps. Also, in another example, a PID controller as described in relation to FIG. 4 may be used to calculate a frame rate for rendering the video.

After calculating the frame rate, as in block 740, the frame rate may be provided to a video application that may be configured, as in block 750, to render the video using the frame rate. Periodically, the frame rate may be reevaluated to determine whether to modify the frame rate based on the temperature of the media device and the effectiveness of the frame rate to contain the temperature of the media device within the target temperature range.

Figure 8:
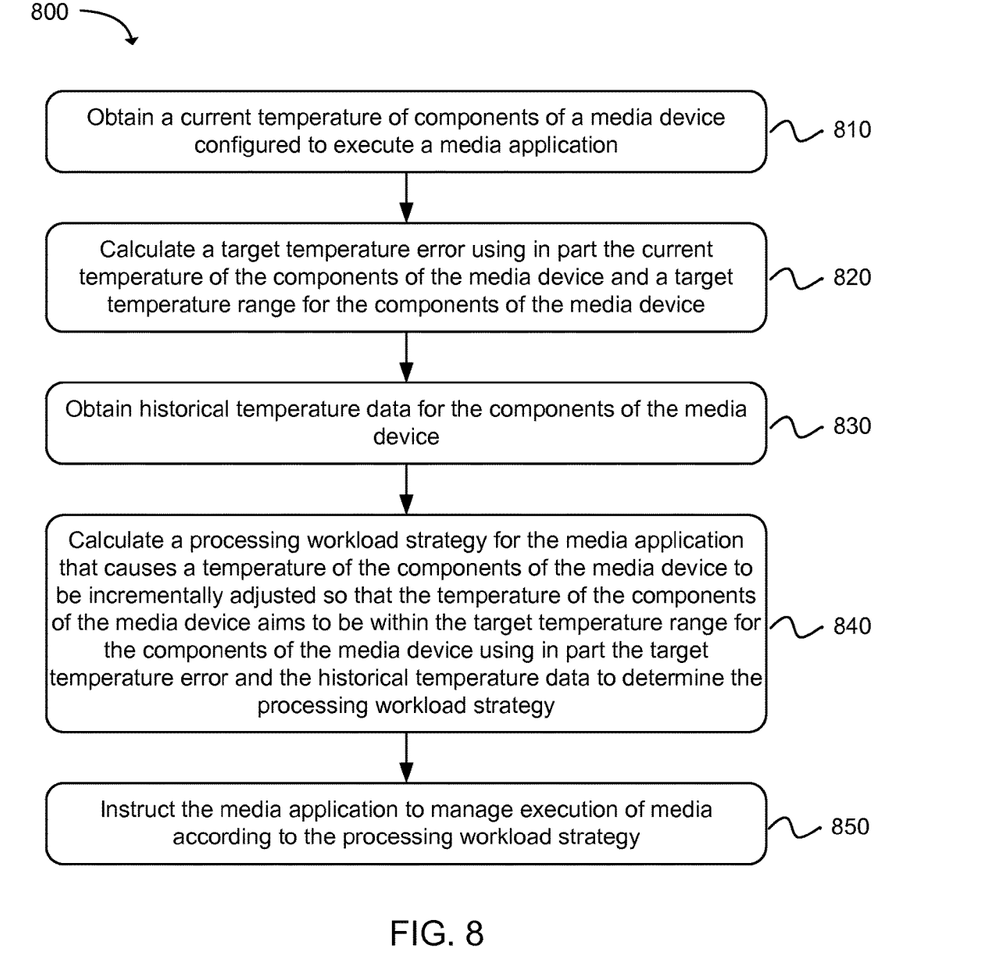
FIG. 8 is a flow diagram that illustrates an example method for calculating a processing workload that causes a media device temperature to be contained within a target temperature range for the media device.

FIG. 8 is a flow diagram illustrating an example method 800 for calculating a processing workload strategy that causes components of a media device temperature to be contained within a target temperature range for the components of the media device. As in block 810, a current temperature may be obtained for components of a media device that may be configured to execute a media application. In one example, the current temperature may be obtained from a temperature sensor included in the media device. In another example, the current temperature may be a skin temperature or a surface temperature obtained by modeling a surface or skin temperature of the media device.

As in block 820, a target temperature error may be calculated using in part the current temperature of the components of the media device and a target temperature range for the components of the media device. For example, the target temperature error may be calculated by determining a difference between the current temperature and the target temperature range.

As in block 830, historical temperature data may be obtained for the components of the media device for a defined time period. For example, the historical temperature data may be for the past few seconds or minutes, or may be for a number of past rendering cycles. As in block 840, a processing workload strategy may be calculated for the media application that causes a temperature of the components of the media device to be incrementally adjusted (e.g., stepped up or down) so that the temperature of the components of the media device aims to be contained within the target temperature range for the components of the media device using in part the target temperature error and the historical temperature data to determine the processing workload strategy. In aiming to contain the temperature of the components of the media device within the target temperature range, the temperature of the components of the media device may be above or below the bounds of the target temperature range and the processing workload strategy may be calculated to incrementally adjust the temperature of the components of the media device in an attempt to bring the temperature of the components of the media device within the target temperature range.

In one example, the processing workload strategy may by calculated using a PID controller that includes a change in temperature error to determine a reaction of the temperature in the components of the media device to change according to the processing workload strategy. After calculating the processing workload strategy, as in block 850, the media application may be instructed to manage execution of media according to the processing workload strategy to contain the temperature of the components of the media device within the target temperature range.

Figure 9:
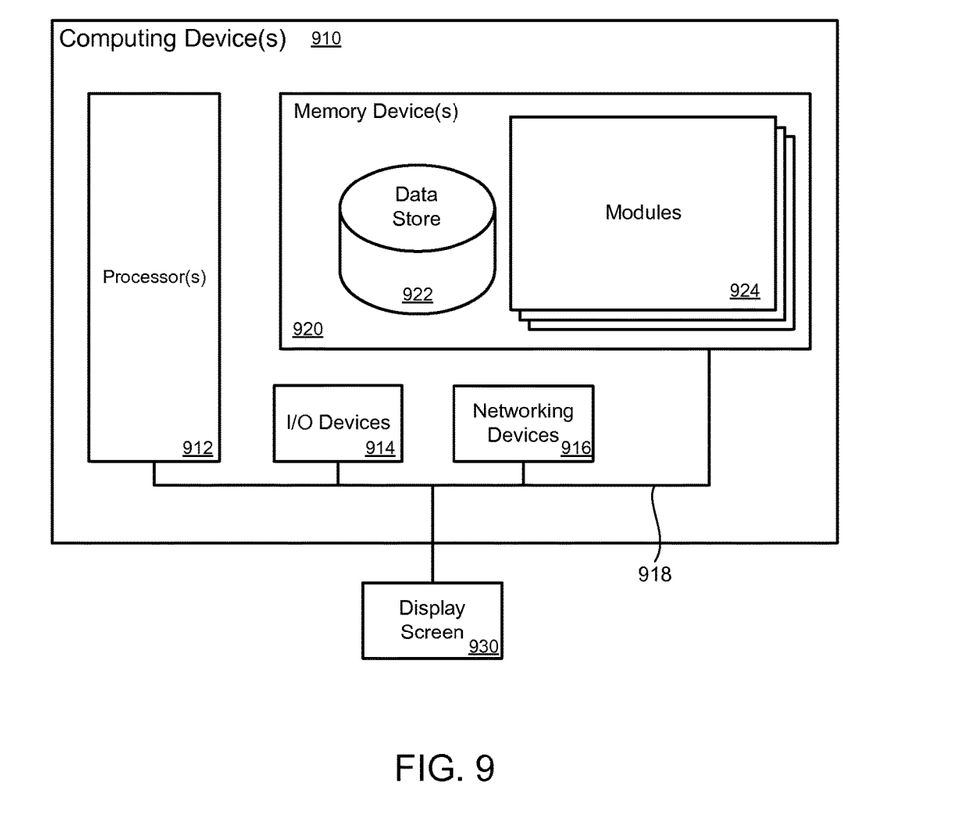
FIG. 9 is block diagram illustrating an example of a computing device that may be used to execute a method for managing the temperature of a media device.

FIG. 9 illustrates a computing device 910 on which modules (e.g., services) of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may include a device temperature module, a surface temperature module, a temperature history module, a workload calculation module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 930 that is available to display output from the computing devices. Other known I/O device may be used with the computing device. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
    obtain a current temperature of a media device configured to render a media object, wherein the current temperature is obtained during a transition between rendering a first media object and a second media object;
    obtain historical temperature data for the media device;
    calculate a rest interval using a Proportional Integral Derivative (PID) controller during which animation of the second media object is configured to be suspended so that a temperature of the media device falls within a target temperature range for the media device, wherein the PID controller includes:
        a proportional term that provides a target temperature error;
        an integral term that provides a historical temperature error using the current temperature of the media device and the historical temperature data for the media device;
        a derivative term that provides a change in temperature error based on a rate of change over a period of time; and
    suspend animation of the second media object for a time period equal to the rest interval.

2. A non-transitory machine readable storage medium as in claim 1, wherein the instructions that when executed by the processor further:
    obtain a cycle time value specifying an amount of time that the media object is rendered to a display;
    providing the cycle time value as an input to the PID controller, wherein the rest interval is associated with the cycle time value.

3. A non-transitory machine readable storage medium as in claim 1, wherein the instructions that when executed by the processor further store the current temperature of the media device to a memory location in the media device containing the historical temperature data for use in future rest interval calculations.

4. A computer implemented method, comprising:
    obtaining, using a processor, a current temperature associated with components of media device configured to execute a media application, wherein the current temperature is obtained during a transition between rendering a first media object and a second media object;
    obtaining, using the processor, historical temperature data for the components of the media device;
    calculating, using the processor, a rest interval for the media application that causes a temperature of the components of the media device to be adjusted so that the temperature of the components of the media device aims to be within a target temperature range for the components of the media device, wherein the rest interval is calculated using a Proportional Integral Derivative (PID) controller that includes:
        a proportional term that provides a target temperature error;
        an integral term that provides a historical temperature error using the current temperature of the media device and the historical temperature data for the media device;
        a derivative term that provides a change in temperature error based on a rate of change over a period of time; and
    instructing, using the processor, the media application to manage execution of media objects according to the rest interval the processing workload strategy.

5. A method as in claim 4, wherein calculating the processing workload strategy further comprises calculating the processing workload strategy using a PID controller that includes a change in temperature error.

6. A method as in claim 4, further comprising:
    determining a processor frequency for the processor included in the media device that contributes to the temperature for the components of the media device; and
    setting the processor frequency of the processor to the frequency.

7. A method as in claim 4, further comprising:
obtaining a batch of media objects via a wireless network connection using a wireless radio;
storing the batch of media objects in computer memory included in the media device; and
reducing a power output of the wireless radio to reduce the temperature of the components of the media device.

8. A method as in claim 4, further comprising:
identifying a background service executing on the media device and is causing the temperature of the components of the media device to increase above the target temperature range; and
suspending the background service.

9. A method as in claim 4, wherein the processing workload strategy for the media application further comprises adjusting a frame rate for displaying video.

10. A method as in claim 4, wherein the processing workload strategy for the application further comprises a rest interval for suspending animation of a media object that is displayed to a display as part of a screen saver.

11. A method as in claim 4, wherein:
obtaining the current temperature of the components of the media device further comprises sampling the temperature of the components of the media device; and
comparing the temperature of the components of the media device to the target temperature range.

12. A method as in claim 4, wherein obtaining the current temperature further comprises modeling a surface temperature of the media device.

13. A method as in claim 4, wherein obtaining the current temperature further comprises obtaining the current temperature from a temperature sensor included within the media device.

14. A method as in claim 4, wherein instructing the media application to manage execution of the media according to the processing workload strategy further comprises instructing the media application to manage the processing workload strategy of a Graphics Processor Unit (GPU) used to execute the media.

15. A method as in claim 4, wherein the media device is an Internet connected device that outputs the media to a display.

16. A system comprising:
a processor;
a memory device including instructions that, when executed by the processor, cause the system to:
obtain a current temperature of a media device configured to render media objects, wherein the current temperature is obtained during a transition between rendering a first media object and a second media object;
obtain historical temperature data for the media device;
determine a temperature difference between the current temperature of the media device and a target temperature range for the media device;
analyze the historical temperature data to determine a rest interval effectiveness of a rest interval to moderate a media device temperature;
analyze the current temperature of the media device and the historical temperature data for the media device and the target temperature range for the media device to determine a rate of temperature change over a time period;
determine the rest interval based in part on the temperature difference, the rest interval effectiveness, and the rate of temperature change; and
suspend animation of the second media object for a time period equal to the rest interval.

17. A system as in claim 16, wherein the memory device includes instructions that, when executed by the processor, causes the system to identify an animation style used to animate the media as being associated with media device temperatures that are above the target temperature range.

18. A system as in claim 16, wherein the memory device includes instructions that, when executed by the processor, causes the system to calculate a cycle time for displaying the media to a display.

19. A system as in claim 16, wherein the memory device includes instructions that, when executed by the processor, causes the system to distribute the rest interval over a cycle time.

20. A system as in claim 16, wherein the current temperature of the media device includes temperatures associated with components of the media device.

* * * * *